Nov. 30, 1937.   Ö. RISZDORFER   2,100,672
PHOTOGRAPHIC CAMERA
Original Filed Sept. 12, 1932

Inventor
Ödön Riszdorfer

Patented Nov. 30, 1937

2,100,672

UNITED STATES PATENT OFFICE 2,100,672

PHOTOGRAPHIC CAMERA

Ödön Riszdorfer, Budapest, Hungary

Original application September 12, 1932, Serial No 632,816. Divided and this application August 6, 1935, Serial No. 34,966. In Hungary September 12, 1931

5 Claims. (Cl. 95—64)

This invention relates to a photographic camera in which the object lens shutter, or the object lens diaphragm, is operated, through a rotary coil instrument, by the current of a photo-electric cell. The spool of the instrument, through which spool the current of the photo-electric cell flows, is supported in bearings in a magnetic field produced by a permanent magnet or by an electromagnet. In order to fix this magnet on the photographic camera in such a manner that it should require as little room as possible, the said magnet is, according to the invention, fixed on the object lens carrier in such a manner, that the said magnet surrounds the frame of the object lens.

For this purpose, the magnet is constructed in the form of a slotted ring arranged co-axially to the object lens of the camera, the rotary coil of the instrument being arranged inside the slot.

The subject of this application is divided out of my parent application, Serial No. 632,816, which has matured into United States Letters Patent No. 2,013,363 dated September 3, 1935.

Figure 1:
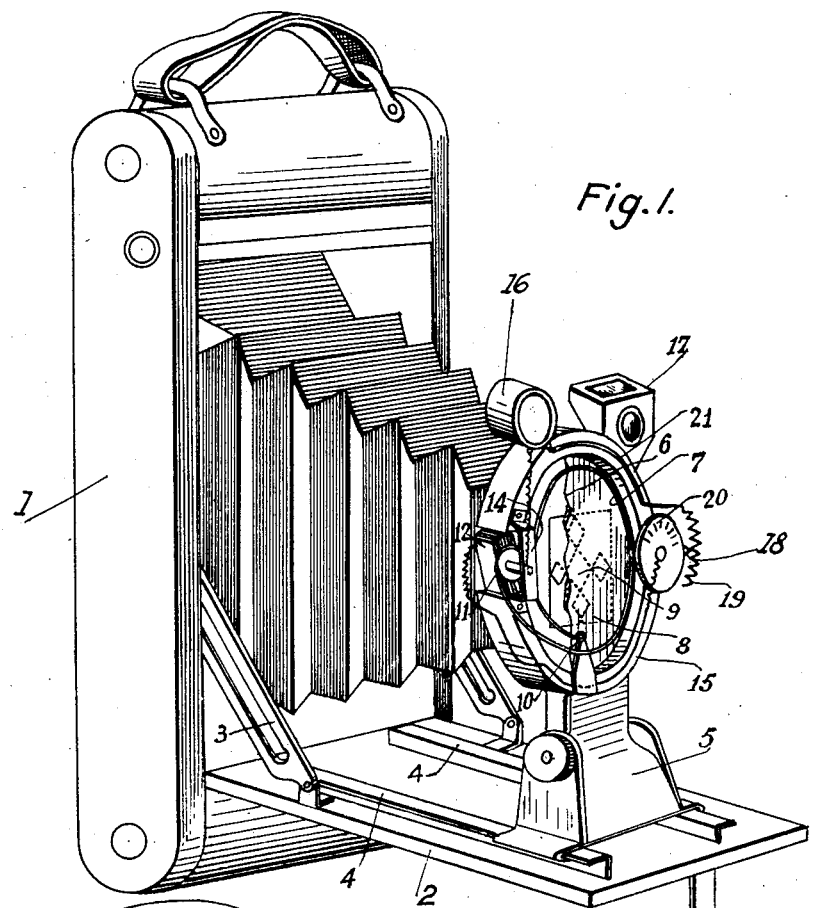
Figure 2:
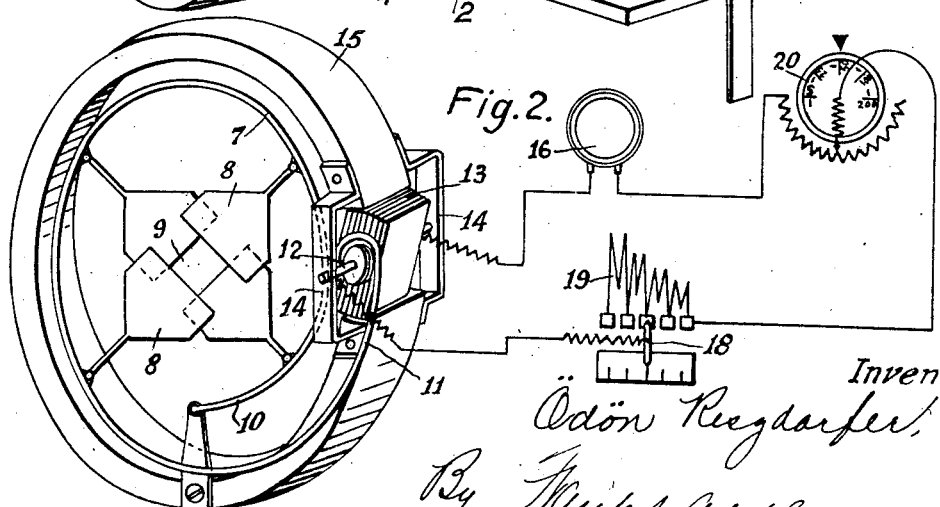

In describing the invention in detail, reference will be had to the accompanying drawing forming part of this application wherein like characters denote corresponding parts in the several views, and in which Figure 1 illustrates a view in perspective of a camera embodying the invention and Figure 2 illustrates a detail view of a diaphragm operating mechanism showing parts associated with it, including the circuits.

In this drawing a folding camera of the usual type is illustrated, comprising the casing 1 and the sliding floor 2, which latter is kept in the open position by the struts 3. The object lens standard 5 is capable of being displaced in the usual manner on the rails 4 provided on the inner face of the sliding floor. The object lens standard carries the object lens itself, behind the front member 6 of which a laminated diaphragm consisting of four lamellae 8 fixed on a helical spring 7 is provided, an opening 9 for the passage of the light being left between the internal edges of the said lamellae. The end 10 of the helical spring 7 is fixed, whilst the other end 11 of the said spring is bent over and secured to the axle 12 of the rotary spool 13. The rotary spool 13 is fixed by means of the links 14 in the slot between the two legs of the magnet 15, which latter surrounds the object lens frame in the manner of a ring and is likewise fixed on the standard 5. The magnet carries the photo-electric cell 16, the finder 17 and the adjusting disc 20 for the shutter. This adjusting disc is fitted with a contact 18 for the electric resistance 19 connected in series with the photo-electric cell 16 and with the winding of the spool 13. This arrangement enables the intensity of the current in the circuit 21 and therefore also in the spool 13 to be influenced by the adjustment of the shutter speed effected with the aid of the adjusting disc 20, so that the amount of deflection of the spool 13 and therewith the magnitude of the opening 9 of the diaphragm are dependent on the magnitude of the shutter speed adjusted in each particular case.

The described arrangement of the magnet 15 possesses the advantage, that a compact device is obtained and that, in spite of the fact that a regulating device comprising a photo-electric cell, as described, has been built into the camera, it is unnecessary to increase the size of the camera above the usual size. The arrangement described also makes it possible to insert the photo-electric device into existing photographic cameras of the usual type.

What I claim is:

1. In a photographic camera, a photographic object lens, a device for the control of light entering the camera through said object lens, a photo-electric cell, a rotary spool instrument deriving current from the photo-electric cell, means whereby the said device is controlled by the rotary spool instrument, and a magnet for the production of a magnetic field for the rotary spool instrument, the said magnet embracing the photographic object lens.

2. In a photographic camera, a photographic object lens, a device for the control of light entering the camera through said object lens, a photo-electric cell, a rotary spool instrument deriving current from the photo-electric cell, means whereby the said device is controlled by the rotary spool instrument, and a magnet for the production of a magnetic field for the rotary spool instrument, the said magnet being ring-like in character and located to embrace the photographic object lens.

3. In a photographic camera, a photographic object lens, a device for the control of light entering the camera through said object lens, a photo-electric cell, a rotary spool instrument deriving current from the photo-electric cell, means whereby the said device is controlled by the rotary spool instrument, and a magnet for the production of a magnetic field for the rotary spool instrument, the said magnet being ring-like in character and located to embrace the photographic object lens, the arrangement of parts being such that the ring is disposed with its center at approximately the optical axis of the lens.

4. In a photographic camera, an objective lens, an adjustable diaphragm for regulating the effective aperture of said lens, an electrical measuring instrument for adjusting the diaphragm and including a coil and a magnetic field system therefor, said magnetic field system embracing the objective lens, and a light sensitive cell in circuit with and adapted to energize said instrument in accordance with the brightness of the scene to be photographed.

5. A photographic camera as claimed in claim 4, wherein said camera is of the folding type in which a member is movable to a position in front of the camera body for use, said member comprising a common support for the objective lens, the electrical measuring instrument and the light sensitive cell.

ÖDÖN RISZDORFER.